United States Patent [19]
Seckerson

[11] 3,745,612
[45] July 17, 1973

[54] RESILIENT FASTENERS

[75] Inventor: Clifford Alexander Seckerson, Iver Heath, England

[73] Assignee: TRW Inc., Cleveland, Ohio

[22] Filed: Mar. 22, 1971

[21] Appl. No.: 126,747

[30] Foreign Application Priority Data
Mar. 23, 1970 Great Britain................... 13,815/70

[52] U.S. Cl.................................. 24/73 PF, 85/5 R
[51] Int. Cl............................................ F16h 19/00
[58] Field of Search............. 16/2; 85/5, 80, DIG. 2,
85/5 R; 24/213 CS, 208 A, 213 B, 213 R, 214,
73 R, 73 MF, 3 FT, 73 PF, 73 HS, 73 P, 73 D,
73 PM, 73 AP, 73 FT

[56] References Cited
UNITED STATES PATENTS

| | | | |
|---|---|---|---|
| 3,181,411 | 5/1965 | Mejlso................................. | 85/5 R |
| 3,230,592 | 1/1966 | Hosea................................. | 24/73 HS |
| 3,485,133 | 12/1969 | Rapata................................ | 85/5 R |
| 3,550,217 | 12/1970 | Collyer.............................. | 24/73 PF |

FOREIGN PATENTS OR APPLICATIONS
1,342,218  9/1963  France................................. 85/5 R

*Primary Examiner*—Donald A. Griffin
*Attorney*—Philip E. Parker, Gordon Needleman, James R. O'Connor and Hall & Houghton

[57] ABSTRACT

A resilient fastener comprising a head and a compressible shank for insertion through a circular aperture in a panel in which the shank includes a central stem which extends longitudinally of the shank from the head so as to include the axis of the shank and two longitudinally extending flanges which are joined to the stem in such a manner that they are resiliently compressible towards the stem, the shank being substantially S-shaped on any transverse section taken at any point over a major part of the length thereof. Preferably, the central stem has two generally parallel major planar faces and the flanges are compressible in a direction normal to the said planar faces in the manner of a concertina action.

4 Claims, 7 Drawing Figures

RESILIENT FASTENERS

BACKGROUND OF THE INVENTION

The present invention relates to a resilient fastener which can be used for attaching an article, such as a trim pad to an apertured support panel.

There is a substantial and continuing demand in industry, and particularly in the automobile industry, for fasteners for attaching articles such as trim pads, cables and mouldings to thin apertured panels. Such fasteners have to be provided with a resilient shank which is a push fit or snap engageable into a circular aperture in the panel to retain the fastener in position on the panel. The shank of this type of fastener has to be of such shape and resilience that it can be relatively easily forced into the aperture so as not to damage the panel as it is being applied to the panel but, when in position, will provide substantial resistance to withdrawal.

Hitherto, problems have been experienced in designing a fastener which has the correct resilience and also in designing a fastener which is itself not liable to damage from scuffing or tearing on the rim of the aperture in the panel as it is inserted.

It is an object of the present invention to provide a fastener which will overcome or alleviate the above described problems and which is economic to manufacture.

STATEMENT OF THE INVENTION

According to one aspect of the present invention, there is provided a resilient fastener comprising a head and a compressible shank adapted to engage through an aperture in a panel, the shank comprising a central stem which extends longitudinally of the shank from the head and which contains the axis of the shank and two longitudinally extending flanges joined to the stem so as to be resiliently compressible towards the stem wherein the flanges are so arranged that the shank is substantially S-shaped on any transverse section taken at any point over a major part of the length thereof.

According to a further aspect of the invention there is also provided an assembly of a fastener as defined above secured to an apertured panel formed with a circular aperture, wherein the diameter of the circular aperture is substantially less than the maximum transverse dimension of the shank of the fastener in the said direction of movement of the flanges and the shank is frictionally engaged through the aperture with the head of the fastener bearing against one side of the panel and the flanges compressed inwardly in the said direction by the rim of the aperture.

DESCRIPTION OF THE PREFERRED EMBODIMENT

Figure 1:
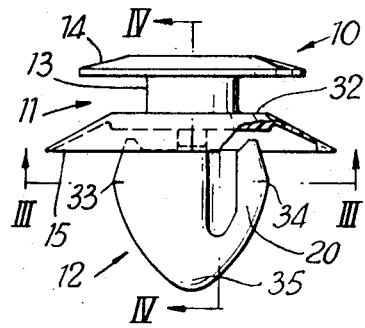
FIG. 1 is an elevation of a fastener according to the present invention with a part thereof broken away.
Figure 2:
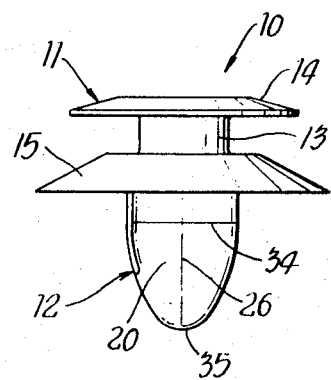
FIG. 2 is a side elevation of the fastener shown in FIG. 1.
Figure 3:
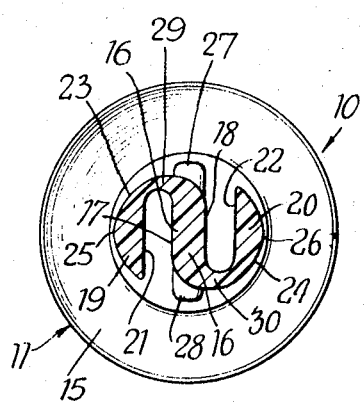
FIG. 3 is a section taken on the line III—III of FIG. 1.
Figure 4:
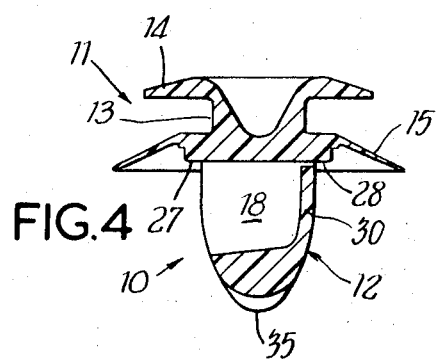
FIG. 4 is a section taken on the line IV—IV of FIG. 1.

In FIGS. 1 to 4, a fastener is indicated generally at 10 which is formed as a one-piece injection moulding from a suitable synthetic plastics material such as an acetal resin.

The fastener 10 comprises a head 11 and a shank 12 and the head 11 has a cylindrical portion 13, which is coaxial with the shank 12, an outer flange 14 and an annular skirt 15 which is dished and flexible. The structure of the head 11 does not form an essential part of the present invention and can be modified in any way to suit the particular purpose it has to play. In the illustrated embodiment, the head 11 is designed to engage in a slot in a trim pad, in a manner described in detail below, but it can be designed to hold a cable or a moulding in a manner well known in the art.

The shank 12, which embodies the present invention, is approximately S-shaped on a transverse section therethrough other than at its tip and comprises a central, longitudinally extending stem 16, which has two flat, generally parallel major faces 17 and 18 and two longitudinally extending flanges 21 and 22 which are joined to the stem 16 and overlie the major faces 17 and 18 respectively of the stem 16.

Figure 6:
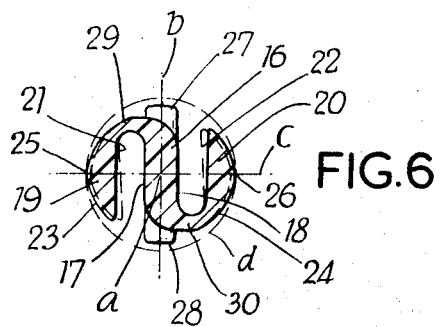
FIG. 6 is a section similar to FIG. 3 showing the shank only of the fastener and FIG. 7 is a section similar to FIG. 6, but taken through a modification of the fastener of FIGS. 1 to 3.

The major faces 17 and 18 of the stem 16 are arranged one on each side of the longitudinal axis "$a$" of the shank and the median plane "$b$" of the stem 16 contains the axis "$a$." The flanges 19 and 20 are formed with flat inner faces 21 and 22 respectively which lie in planes parallel with the major faces 17 and 18 of the stem and convexly curved outer faces 23 and 24 respectively. The outer faces 23 and 24 of the flanges have a multiple curvature, being curved in a longitudinal sense, as seen from FIG. 1, and in a transverse plane as seen from FIG. 3. The curvature of the faces 23 and 24 in any transverse plane therethrough, is not arcuate, as can be seen from FIGS. 3 and 6, and the radius of curvature changes along longitudinal lines 25 and 26 respectively which lines form apices lying in a plane "$c$" which contains the axis "$a$" and which is perpendicular to plane "$b$." Thus, the minimum circumscribing circle "$d$" of the shank 12, on any transverse section therethrough, touches the shank at the apices 25 and 26 which lie in a plane perpendicular to the plane "$b$" and therefore perpendicular to the planes of the major faces of the stem 16.

Adjacent the skirt 15, the stem 16 is extended to form abutments 27 and 28. Over the remainder of the length of the stem the dimension of the shank in the plane "$b$" is substantially less than its dimension in the plane "$c$."

The flanges 19 and 20 are joined to the stem 16 by flexible webs 29 and 30 respectively which act as hinges allowing the flanges to move inwardly towards the stem 16 so that the shank can be compressed in the general direction of the plane "$c$." The flanges 19 and 20 terminate short of the skirt 15 so that the maximum movement of each flange occurs at the upper corners 31 and 32. The outer face 23 and 24 of each flange is formed with a shoulder 33 and 34 and the shank 12 tapers from the shoulders 33 and 34 towards the skirt 15 and also towards the tip 35 of the shank which is solid and approximately hemispherical.

Figure 5:
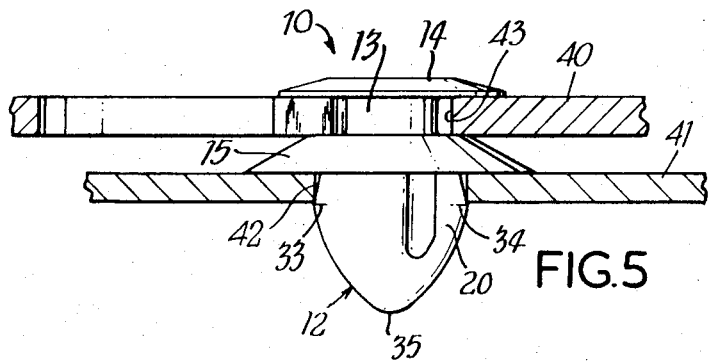
FIG. 5 is an elevation partly in section showing the fastener of FIGS. 1 to 4 attaching a trim pad to an apertured support panel.

In use, the fastener 10 attaches a trim pad 40 to a panel 41 formed with a circular aperture 42 in the manner shown in FIG. 5. The trim pad 40 has a preformed keyhole shaped slot 43 and the head 11 of the fastener is engaged in the slot 43 in a well known manner by passing the retaining flange 14 through the major portion of the slot 43 and sliding the cylindrical portion 13 along the slot 43 into the minor portion so that the trim pad 40 is trapped between the flange 14 and the skirt 15.

The trim pad 40, with the shank of the fastener 10 projecting therefrom is then brought up to the panel 41 and the shank 12 is forced into the circular aperture 42. The diameter of the aperture 42 is substantially less than the diameter of the circumscribing circle "$d$" of the shank at the shoulders 31 and 32. Initially, the tapered solid tip 35 of the shank provides an easy lead in to the aperture 42 but as the shank enters the aperture, the rim of the aperture engages the flanges 19 and 20 along the apices 25 and 26, forcing the flanges inwardly towards the stem 16. As the shank 12 is compressed, the flanges hinge inwardly about the webs 29 and 30 so that the shank is compressed approximately in the plane "$c$" until the shoulders 33 and 34 pass through the aperture 42. Thereafter, the flanges are released slightly and provide a camming effect on the rim of the aperture 42, which draws the skirt 15 tightly on to the upper surface of the panel 41 to form a seal around the aperture 42. As the shoulders 33 and 34 pass through the aperture, the abutments 27 and 28 enter the aperture and locate against the rim of the aperture to prevent play between the fastener and the panel in the plane "$b$."

Because of the change in curvature of the outer faces 23 and 24 of the flanges which forms the apices 25 and 26 only a relatively small surface area of the flanges engages the rim of the aperture 43 and this reduces the frictional resistance to insertion of the shank into the fastener. Furthermore, because the apices 25 and 26, which form the compression points, are arranged on an axial plane "$c$" perpendicular to the median axial plane "$b$" of the stem 16, rotational movement of the flanges relative to the rim of the aperture 43 is reduced to a minimum thus reducing any risk of damage, by tearing, to the flanges 19 and 20.

The resistance of the shank 12 to removal from the aperture 43 can be varied as required by altering the taper on the upper ends of the flanges 19 and 20 or the overall length of the flanges.

It will thus be seen that the fastener 10 provides a shank which is a relatively simple shape and thus easy to mould and which minimises both the frictional resistance to insertion in an apertured panel and the danger of damage to the shank during insertion.

Figure 7:
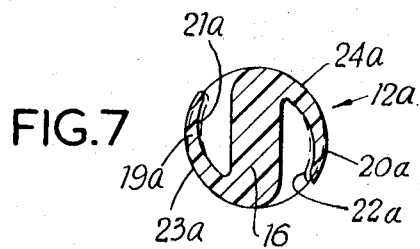

In a modification of the shank, which is shown in FIG. 7, the shank 12a is provided with flanges 19a and 20a having arcuately curved outer surfaces 23a and 24a and arcuately curved inner surfaces 21a and 22a. In all other respects the shank 12a is similar to the shank 12.

Further minor modifications can be made to the above described embodiment without departing from the spirit and scope of the invention which is best described in the following claims.

What I claim is:

1. A resilient fastener comprising a head and a compressible shank adapted to engage through a circular aperture in a panel, the shank comprising a solid central stem having two generally parallel, major planar faces, which stem extends longitudinally of the shank from the head and contains the axis of the shank, and two longitudinally extending flanges joined to opposite longitudinal edges of the stem by flexible webs and terminating short of the head, the outer face of each flange being convexly curved in any plane perpendicular to the longitudinal axis of the shank and the inner face of each flange being substantially straight and lying in a plane substantially parallel to the opposed face of the stem in spaced relationship to said opposed face, whereby said flanges are resiliently compressible towards the stem in a direction normal to the faces of the stem to provide for a smooth, concertinalike compression of said shank during insertion in a panel aperture, said shank being formed with a solid tip and with an external shoulder on each flange and tapering from the shoulders towards the tip and the head, the maximum dimension of the shank in any plane perpendicular to the longitudinal axis of the shank in the region of the shoulders being substantially greater along an axis perpendicular to said major faces of the stem than along an axis parallel to said faces, and the head of said fastener being formed with two projections which form extensions of the stem and which are adapted to locate the shank in a circular aperture.

2. A fastener as claimed in claim 1, wherein the outer face of each flange is convexly curved in any longitudinal axial plane of the shank.

3. A fastener as claimed in claim 1, wherein the outer face of each flange on each side of an axial plane perpendicular to the major faces of the stem is convexly curved in any plane perpendicular to the longitudinal axis of the shank about two different axes of curvature.

4. An assembly of a fastener as claimed in claim 1 secured to an apertured panel formed with a circular aperture, wherein the diameter of the circular aperture is substantially less than the maximum transverse dimension of the shank of the fastener in the said direction of movement of the flanges and the shank is frictionally engaged through the aperture with the head of the fastener bearing against one side of the panel and the flanges compressed inwardly in the said direction by the rim of the aperture, and wherein the distance between a pair of axial planes parallel to the axis of the shank and lying tangent to the outer surfaces of the flexible webs of the fastener is substantially less than the diameter of the circular aperture in the panel whereby, in the assembly, said outer surfaces of the webs are spaced inwardly from the wall of the panel defining the circular aperture.

* * * * *